(12) United States Patent
Luo et al.

(10) Patent No.: US 12,288,172 B2
(45) Date of Patent: Apr. 29, 2025

(54) RESOURCE PLANNING FOR AN ONLINE CONCIERGE SYSTEM BASED ON PREDICTIVE MODELING

(71) Applicant: Maplebear Inc., San Francisco, CA (US)

(72) Inventors: Haochen Luo, Conroe, TX (US); Eric Hermann, San Francisco, CA (US); Rishab Saraf, Redmond, WA (US); Abhinav Darbari, Kirkland, WA (US); Teodor Lefter, Austin, TX (US); Kenneth Jason Sanchez, Orange, CA (US); Jagannath Putrevu, Daly City, CA (US)

(73) Assignee: Maplebear Inc., San Francisco, CA (US)

( * ) Notice: Subject to any disclaimer, the term of this patent is extended or adjusted under 35 U.S.C. 154(b) by 141 days.

(21) Appl. No.: 18/156,347

(22) Filed: Jan. 18, 2023

(65) Prior Publication Data
US 2024/0242145 A1 Jul. 18, 2024

(51) Int. Cl.
*G06Q 10/0631* (2023.01)
*G06Q 10/0639* (2023.01)
(Continued)

(52) U.S. Cl.
CPC ........... *G06Q 10/063118* (2013.01); *G06Q 10/06398* (2013.01); *G06Q 10/08355* (2013.01);
(Continued)

(58) Field of Classification Search
None
See application file for complete search history.

(56) References Cited

U.S. PATENT DOCUMENTS 7,295,990 B1 * 11/2007 Braumoeller ........ G06Q 10/063
705/28
7,389,249 B2 * 6/2008 Hsu ...................... G06Q 10/087
705/28
(Continued)

FOREIGN PATENT DOCUMENTS

WO WO-2011129872 A1 * 10/2011 ............. G06Q 10/06
WO WO-2018068024 A1 * 4/2018 ............. B25J 5/007

OTHER PUBLICATIONS

Olivia "Drive Your Business With Predictive Analytics", Dec. 2012, Predictive Analytics Expert and Principle at OLIVIAGroup, pp. 1-10 (Year: 2012).*
(Continued)

*Primary Examiner* — Romain Jeanty
(74) *Attorney, Agent, or Firm* — Fenwick & West LLP

(57) ABSTRACT

An online concierge shopping system fulfills orders using workers who pick items at a warehouse to complete an order and workers to deliver the orders to a customer's location. To optimize the staffing of workers for each task, the system uses a trained model to predict the number of workers needed to achieve an optimal outcome based on an input set of contextual information. The system also schedules specific workers to various shifts using the predicted number of workers needed and then searching a feasibility space for an optimal solution. The trained model may be updated based on performance observations.

20 Claims, 3 Drawing Sheets

(51) Int. Cl.
*G06Q 10/0835* (2023.01)
*G06Q 10/087* (2023.01)
*G06Q 30/0202* (2023.01)
*G06Q 30/0601* (2023.01)

(52) U.S. Cl.
CPC ....... *G06Q 10/087* (2013.01); *G06Q 30/0202* (2013.01); *G06Q 30/0635* (2013.01)

(56) References Cited

U.S. PATENT DOCUMENTS

| 8,458,007 B2* | 6/2013 | Shafiee | G06Q 10/06316 |
| | | | 705/7.26 |
| 2020/0311652 A1* | 10/2020 | Morin | G06Q 10/06 |
| 2022/0374765 A1* | 11/2022 | Wu | G06F 16/24578 |

OTHER PUBLICATIONS

Holmberg "A Method of Predicting Workload and Staffing Level for Radiotherapy Treatment Planning as Plan Complexity Changes", Sep. 2003, Clinical Oncology vol. 15, Issue 6, pp. 359-363 (Year: 2003).*

* cited by examiner

RESOURCE PLANNING FOR AN ONLINE CONCIERGE SYSTEM BASED ON PREDICTIVE MODELING

BACKGROUND

In an online concierge system, customers may select items for ordering, procurement, and delivery from physical retailers or other warehouses. A significant challenge in such a system is maintaining appropriate staffing levels at various times for performing tasks such as picking items for orders from warehouses and delivering orders to customers. For example, where a system automatically assigns users to service orders, existing technologies may fail to properly forecast usage demand from other users, which can lead to under- or over-staffing.

SUMMARY

In accordance with one or more aspects of the disclosure, a resource planning system facilitates intelligent prediction and optimization of labor staffing levels and shift scheduling based on predictive modeling. An online concierge system obtains historical staffing data that processes order requests from customers via a customer application, assigns the order requests to available pickers to procure items from a warehouse, and generates routing instructions for facilitating deliveries to the customers by delivery drivers in accordance with the order requests. The online concierge system applies a staffing level forecasting model to the historical staffing data to predict an optimal staffing level for the warehouse during a future time period in accordance with optimization criteria. The online concierge system assigns staff of the warehouse to shifts during the future time period based in part on the optimal staffing level. The online concierge system observes a performance metric of the online concierge system when operating with the assigned staff during the future time period, and updates one or more parameters of the staffing level forecasting model based on the performance metric.

In an embodiment, the staffing level forecasting model comprises a time series model that predicts the optimal staffing level based on a sequence of feature sets associated with historical time periods derived from the historical staffing data. In an embodiment, the staffing level forecasting model comprises at least one machine learning model trained on a set of features derived from the historical staffing data.

In an embodiment, the staffing level forecasting model predicts the optimal staffing level associated with at least one of a number of pickers to pick items for received orders, and a number of delivery drivers to deliver orders to customers.

In an embodiment, the performance metric comprises at least one of a staff utilization rate, a waiting frequency indicative of a rate at which there was a wait time between receiving an order and beginning to fulfill the order, and a fallback frequency indicative of a rate at which an external service provider separate from the staff was utilized for order fulfillment.

In an embodiment, obtaining the historical staffing data includes obtaining one or more features for each of a set of historical time intervals. The features may include, for example, a number of staff available at the warehouse, a total labor time associated with fulfilling orders, a day of the week, an hour of the day, an indication of whether the day is a holiday, a staff utilization rate, an average speed per item associated with a labor task, an order volume, a waiting frequency indicative of a rate at which there was a wait time between receiving an order and beginning to fulfill the order, and a fallback frequency indicative of a rate at which an external service provider separate from the staff was utilized for order fulfillment.

In an embodiment, the staffing level forecasting model comprises a queue model that performs simulations of the online concierge system and generates the optimal staffing level based on the simulations.

In an embodiment, assigning the staff of the warehouse to the shifts comprises maximizing a constrained objective function based on a cumulative labor efficiency value. The constraints may include at least one of a first constraint that each shift for a worker starts later than a start of an availability window for the worker, a second constraint that each shift for the worker ends earlier than an end of the availability window for the worker, a third constraint that multiple shifts for the worker do not overlap, and a fourth constraint that each shift includes at least the optimal staffing level predicted by the staffing level forecasting model.

In another aspect, a computer system includes one or more processors and a non-transitory computer-readable storage medium that stores instructions executable by the one or more processors for performing any of the methods described above.

DETAILED DESCRIPTION

Figure 1:
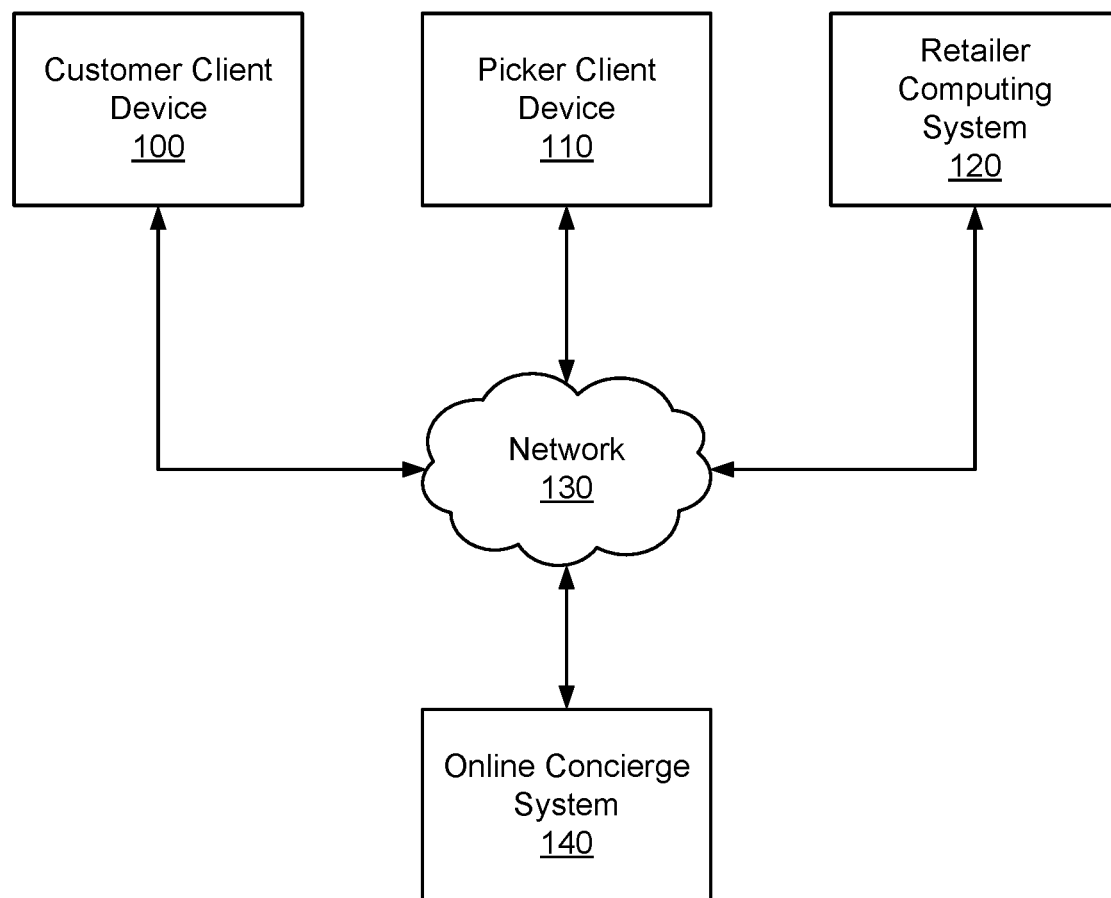
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 may provide item data indicating which items are available at retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
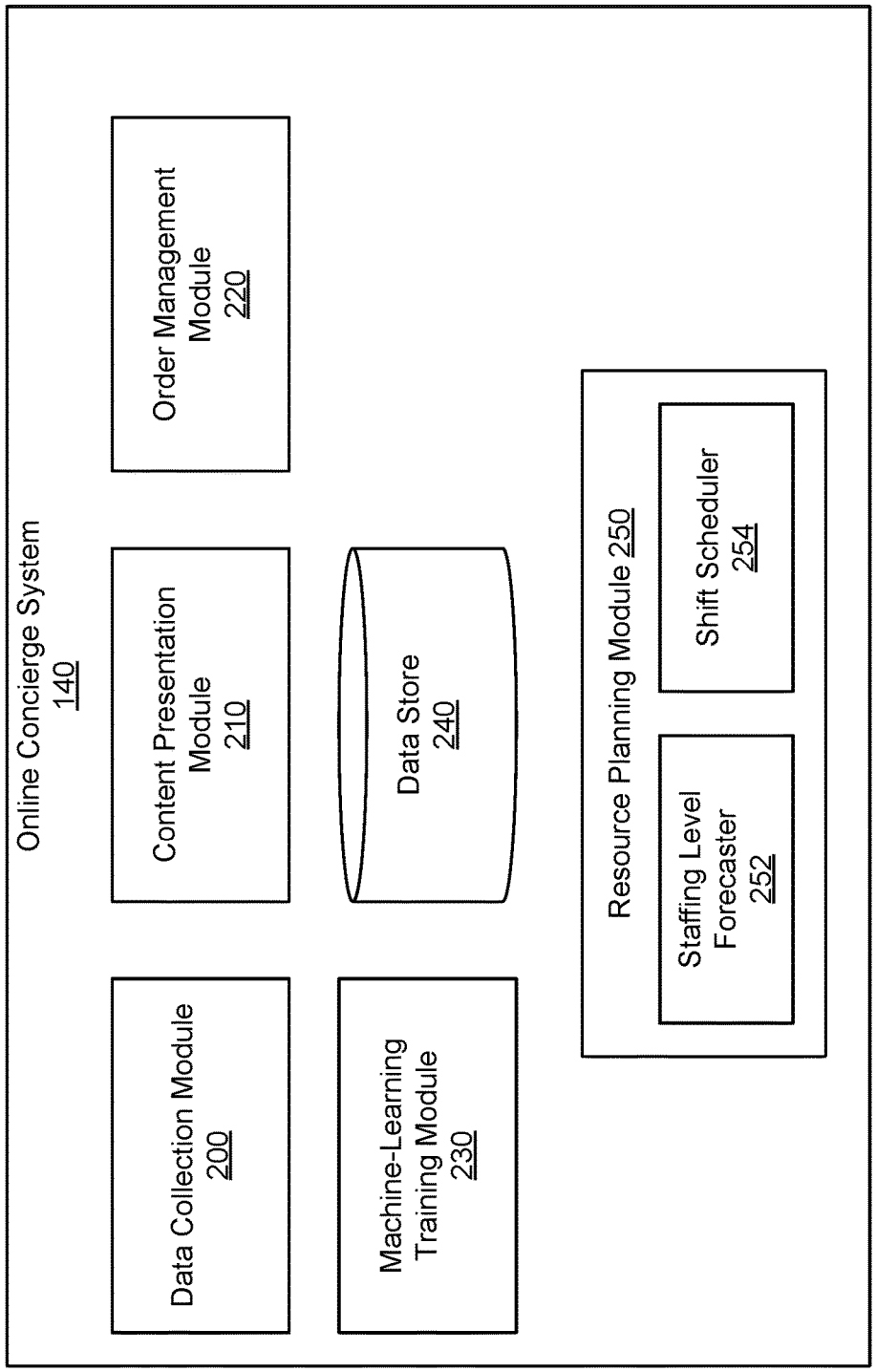
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order, or to an offsite staging area where items have been preemptively picked. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location or other staging area. When the picker arrives, the order management module 220 transmits the order to the picker client device 110 for display to the picker. As the picker uses the picker client device 110 to collect items at the retailer location or other staging location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples.

Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

A resource planning module 250 generates recommendations for managing staffing levels for pickers and/or delivery drivers associated with a warehouse. The resource planning module 250 includes a staffing level forecaster 252 that predicts the optimal number of staff for performing picking and/or delivery tasks associated with a warehouse during some future time period, and a shift scheduler 254 that generates shift assignments to specific available workers over some future time period. The optimal number of staff may be a number of staff that best complies with a set of optimization criteria.

The staffing level forecaster 252 may comprise a machine learning model that is trained to output a predicted optimal staffing level for a warehouse for a time period based on a set of historic staffing levels at a sequence of historic time periods. For example, the staffing level forecaster 252 may comprise a time series model that solves $y_t = f(y_{t-1}, y_{t-2}, \ldots, y_{t-n})$, where $y_t$ is the predicted staffing level in the currency time period, $y_{t-1}, y_{t-2}, \ldots, y_{t-n}$ are staffing levels (actual observed staffing levels or inferred optimal staffing levels) in a set of previous time periods, and n is the planning horizon (i.e., the number of prior time periods used in the prediction for the current time period). In one or more embodiments, the time series model may predict optimal staffing levels indirectly based on a sequence of performance metrics related to optimal staffing levels during the historic time periods.

The staffing level forecaster 252 may utilize a combination of time series and traditional machine learning models. For example, the staffing level forecaster 252 may train one or more of the following types of models to make predictions: an autoregressive integrated moving average model (ARIMA) or variation thereof (e.g., an autoregressive integrated moving average model with exogenous factors model (ARIMAX), a seasonal autoregressive integrated moving average model (SARIMA), a seasonal autoregressive integrated moving average with exogenous factors (SARIMAX) model), an autoregressive conditional heteroscedasticity (ARCH) model or variation thereof (e.g., an autoregressive conditional heteroscedasticity with exogenous factors (ARCH-X) model), a gradient boosted tree model, a boosted model, and/or other models.

These models may be trained based on historical staffing data. Here, the historical staffing data may span a predefined time period (e.g., one month) that may be used to predict optimal staffing levels associated with a predefined future time period (e.g., the following week) at predefined increments (e.g., every hour). Predictions may be made at the warehouse level (i.e., the models may make separate predictions for each individual warehouse). The model may make predictions for a given warehouse based on historical data only from that warehouse or based on historical data from a larger group of warehouses. In one or more embodiments, separate models (which may have different hyperparameters) may be trained for different types of staff. For example, different models may be trained and applied to separately make predictions for the optimal number of pickers to staff at a given warehouse during a future time period, and the number of delivery drivers to have available at a given warehouse during the future time period.

The historical staffing data may include various features relevant to predicting optimal staffing levels. For example, relevant features derivable from the historical staffing data may include, for each historical time period associated with a given warehouse and a given task (e.g., picking or driving): a number of staff (e.g., pickers or drivers) utilized by the warehouse during the historical time period, the total labor time (picking or driving) associated with fulfilling each historical order during the historical time period, the day of the week and hour of the day associated with the historical time period, whether or not the historical time period falls on a holiday, the staff utilization rate (picking or delivery) in the historical time period, the average picking speed per item (e.g., seconds per item) during the historical time period (this feature may be relevant to picking staff predictions only), average delivery time (this feature may be relevant to delivery staff predictions only), the order volume for each historical time period, a waiting frequency measuring the rate at which there was a wait to begin picking or delivering orders (e.g., due to insufficient staff) during the historical time period, a fall back frequency measuring a rate at which the warehouse fell back on use of external service providers to fulfill orders (e.g., due to insufficient internal warehouse staff), and/or other information.

In one or more embodiments, the labor time (picking time or driving time) may be used as an autoregressive variable in the time-series models described above with other features being used as exogenous variables. For traditional ML models, all of the features or a subset of the above-described features may be used in each model for training and inference.

In one or more embodiments, the staffing level forecaster 252 may use various metrics to evaluate the predictions made by the staffing level forecaster 252. For example, the staffing level forecaster 252 may observe for a given warehouse during each time period, the staffing utilization rate, the wait frequency, and/or the fallback frequency as described above as performance metrics for evaluating predictions. These or additional metrics may be combined in a cost function reflecting an overall performance during the time period that reflects how well optimized the staffing level was during that time period. These performance measures may be used for training the machine learning models used by the staffing level forecaster 252 (e.g., through backpropagation or other techniques). For example, in an initial training stage, a set of historical data may be obtained and one or more machine learning algorithms may execute to learn model parameters that optimize the cost function over the historic period. The models may furthermore be updated over time by evaluating the cost function resulting from enforcing the staffing levels recommended by the staffing level forecaster 252 and updating model parameters to further improve predictive performance in future iterations.

Additionally or alternatively, the staffing level forecaster 252 may employ a queuing model to estimate optimal staffing levels. Here, each model (for different types of staff) can be modeled as M/M/c queues. In an M/M/c queue model, "M" refers to the assumption that arrivals to the queue and service times are both exponential distributions. The "c" refers to the number of staff (pickers or delivery drivers) available to service the queue. This model can be used to predict the optimal staffing levels for a warehouse during a given time period by simulating the arrival and service of orders in a queue and determining the number of staff needed to maintain a certain performance metrics (e.g., utilization rate, wait frequency, or fallback frequency). By running simulations with different staffing levels, the model can help determine the optimal number of staff for a given task during a given time period. In one or more embodiments a queue model or other simulation model may be used to generate the initial performance metrics or other simulated historical data for training the machine learning models described above.

The shift scheduler 254 generates assignments of individual workers to specific shifts to fulfill the recommended staffing levels (generated by the staffing level forecaster 252) and to meet other various constraints. Constraints may include, for example, scheduling workers only during their personal windows of availability, scheduling each worker to meet a minimum and/or maximum number of hours over a given time period (e.g., at least X hours per week and not more than Y hours per week), or other constraints. In one or more embodiments, the shift scheduler 254 furthermore operates to optimize the total time efficiency for workers on shift (e.g., optimize picking time per item and/or delivery time per order). For example, a labor efficiency value may be defined as $e_{ij}=1/SPI_{ij}$ where i is the identity of a worker, j is an identifier for a shift, and SPI is the speed-per-item (picking speed or delivery speed). An objective function may seek to assign workers to shifts in a manner that maximizes the summation of all $e_{ij}$ for all workers and shifts without violating any constraints.

In one or more embodiments, the shift scheduler 254 may solve an optimization problem to generate shift assignments by maximizing an objective function as follows:

$$\max \sum_i \sum_j x_{ij}/SPI_{ij}$$

Where I is the set of workers and i∈ I is the index for a single workers; J is the set of all possible shifts and j∈ J is the index for a particular shift; T is the set of discrete time stamps (e.g., every hour) and t∈ T is the index for a particular time stamp. The model also includes the following parameters: $c_t$ is the number of workers required at time t, as predicted by the staffing level forecaster 252, $s_j, u_j$ are the start time and end time of shift j, and $a_i, b_i$ are the start time and end time of the availability window of worker i. $x_{ij}$ is a binary variable indicating whether or not to schedule the worker i on shift j, where $x_{ij}=1$ if yes and $x_{ij}=0$ if no. Furthermore, the model may enforce the following constraints:

$\sum_j s_j x_{ij} \geq a_i$ for i∈ I (enforces that shift starts later than availability window starts for worker i)

$\sum_j u_j x_{ij} \leq b_i$ for i∈ I (enforces that shift ends earlier than availability window ends for worker i)

$\sum_{j: s_j \leq t, u_j \geq t} x_{ij} \leq 1$ for i∈ I, t∈ T (enforces that shifts for each worker i do not overlap)

$\sum_i \sum_{j: s_j \leq t, u_j \geq t} x_{ij} \geq c_t$ for t∈ T (enforces that the number of workers that are on shift at time t should be at least the recommended number of workers $c_t$ identified by the staffing level forecaster 252)

In one or more embodiments, the resource planning module 250 may integrate with a human resources management system of a business (e.g., via an application programming interface) that stores information about availability of workers and shift assignments. The resource planning module 250 may then generate outputs that directly assign shifts to workers in the assignment system.

Figure 3:
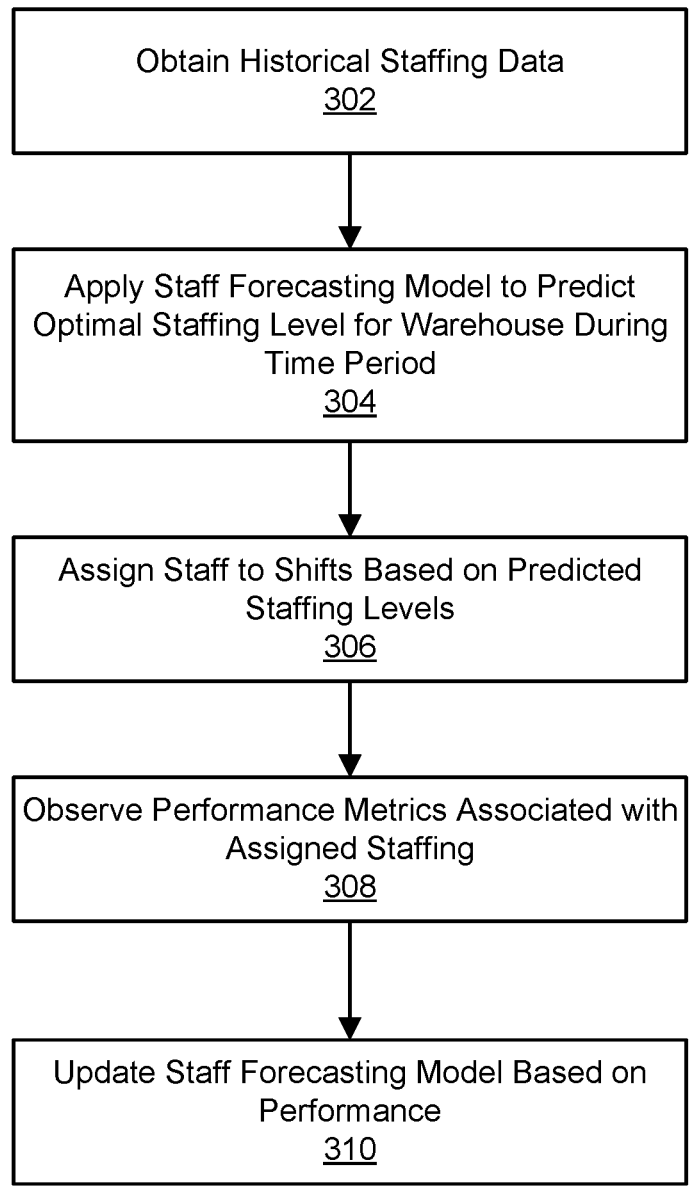
FIG. 3 is a flowchart illustrating an example embodiment of a process for facilitating resource planning in an online concierge system.

FIG. 3 is a flowchart illustrating a method for facilitating preemptive picking of items (prior to them being ordered) based on a predictive model. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 obtains 302 historical staffing data for a relevant time period. The historical staffing data may specify, for each warehouse and type of worker (e.g., picker or driver), a number of staff during each time interval over a historical time period. For example, for each warehouse associated with the online concierge system 140, the online concierge system 140 may obtain historical staffing data for each one-hour increment over a prior one-month period. The online concierge system 140 applies 304 a staffing level forecasting model to predict optimal staffing levels for the warehouse for one or more future time periods (e.g., one-hour intervals over the next one week). For example, the online concierge system 140 may utilize any of the techniques described above to forecast staffing levels using various machine learning techniques. The online concierge system 140 assigns 306 staff to shifts based on the predicted optimal staffing levels. Here, the online concierge system 140 may generate the assignments using any of the techniques described above in relation to the shift scheduler 254 while meeting the overall staffing levels predicted by the staffing level forecaster 252 and enforcing any constraints associated with the shift scheduling model. The online concierge system 140 observes 308 one or more performance metrics associated with the staff assignments that may be indicative of performance of the predictions. For example, the performance metrics may directly or indirectly reflect whether the warehouse is overstaffed or understaffed during the relevant time periods. The online concierge system 140 updates 310 the staff forecasting model based on the observed performance metrics. For example, the online concierge system 140 may update hyperparameters of a time-series model and/or weights of a traditional machine learning model in a manner expected to improve performance metrics in future iterations.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
    obtaining historical staffing data associated with an online concierge system that processes order requests from customers via a customer application, assigns the order requests to available pickers to procure items from a warehouse, and generates routing instructions for facilitating deliveries to the customers by delivery drivers in accordance with the order requests;
    training a staffing level forecasting model as a machine-learning model with the historical staffing data, wherein training of the staffing level forecasting model comprises:
        evaluating an order fulfillment efficiency based on staffing levels over a historical time period,
        generating training data based on the order fulfillment efficiency of the staffing levels over the historical time period, and
        training the staffing level forecasting model with the training data to predict a staffing level for a future time period;
    applying the staffing level forecasting model to predict an optimal staffing level for the warehouse during the future time period to achieve a target order fulfillment efficiency;
    assigning staff of the warehouse to shifts during the future time period based in part on the optimal staffing level predicted by the staffing level forecasting model;
    evaluating order fulfillment efficiency of the online concierge system when operating with the assigned staff during the future time period;
    comparing the evaluated order fulfillment efficiency for the future time period to the target order fulfillment efficiency; and
    retraining the staffing level forecasting model by updating one or more parameters of the staffing level forecasting model based on the comparison of the evaluated order fulfillment efficiency to the target order fulfillment efficiency.

2. The method of claim 1, wherein the staffing level forecasting model comprises a time series model that predicts the optimal staffing level based on a sequence of feature sets associated with historical time periods derived from the historical staffing data.

3. The method of claim 1, wherein the staffing level forecasting model comprises at least one machine learning model trained on a set of features derived from the historical staffing data.

4. The method of claim 1, wherein the staffing level forecasting model predicts the optimal staffing level associated with at least one of:
- a number of pickers to pick items for received orders; and
- a number of delivery drivers to deliver orders to customers.

5. The method of claim 1, further comprising:
evaluating a performance metric of the online concierge system when operating with the assigned staff during the future time period, wherein the performance metric comprises at least one of:
- a staff utilization rate;
- a waiting frequency indicative of a rate at which there was a wait time between receiving an order and beginning to fulfill the order; and
- a fallback frequency indicative of a rate at which an external service provider separate from the staff was utilized for order fulfillment,
wherein retraining of the staffing level forecasting model is further based on the performance metric.

6. The method of claim 1, wherein obtaining the historical staffing data includes obtaining one or more of the following features for each of a set of historical time intervals:
- a number of staff available at the warehouse;
- a total labor time associated with fulfilling orders;
- a day of the week;
- an hour of the day;
- an indication of whether the day is a holiday;
- a staff utilization rate;
- an average speed per item associated with a labor task;
- an order volume;
- a waiting frequency indicative of a rate at which there was a wait time between receiving an order and beginning to fulfill the order; and
- a fallback frequency indicative of a rate at which an external service provider separate from the staff was utilized for order fulfillment.

7. The method of claim 1, wherein the staffing level forecasting model comprises a queue model that performs simulations of the online concierge system and generates the optimal staffing level based on the simulations.

8. The method of claim 1, wherein assigning the staff of the warehouse to the shifts comprises:
maximizing a constrained objective function based on a cumulative labor efficiency value.

9. The method of claim 8, wherein maximizing the constrained objective functions comprises:
enforcing one or more constraints including one or more of:
- a first constraint that each shift for a worker starts later than a start of an availability window for the worker;
- a second constraint that each shift for the worker ends earlier than an end of the availability window for the worker;
- a third constraint that multiple shifts for the worker do not overlap; and
- a fourth constraint that each shift includes at least the optimal staffing level predicted by the staffing level forecasting model.

10. A computer program product comprising a non-transitory computer readable storage medium having instructions encoded thereon that, when executed by a processor, cause the processor to perform steps comprising:
obtaining historical staffing data associated with an online concierge system that processes order requests from customers via a customer application, assigns the order requests to available pickers to procure items from a warehouse, and generates routing instructions for facilitating deliveries to the customers by delivery drivers in accordance with the order requests;
training a staffing level forecasting model as a machine-learning model with the historical staffing data, wherein training of the staffing level forecasting model comprises:
evaluating an order fulfillment efficiency based on staffing levels over a historical time period,
generating training data based on the order fulfillment efficiency of the staffing levels over the historical time period, and
training the staffing level forecasting model with the training data to predict a staffing level for a future time period;
applying the staffing level forecasting model to predict an optimal staffing level for the warehouse during the future time period to achieve a target order fulfillment efficiency;
assigning staff of the warehouse to shifts during the future time period based in part on the optimal staffing level predicted by the staffing level forecasting model;
evaluating order fulfillment efficiency of the online concierge system when operating with the assigned staff during the future time period;
comparing the evaluated order fulfillment efficiency for the future time period to the target order fulfillment efficiency; and
retraining the staffing level forecasting model by updating one or more parameters of the staffing level forecasting model based on the comparison of the evaluated order fulfillment efficiency to the target order fulfillment efficiency.

11. The computer program product of claim 10, wherein the staffing level forecasting model comprises a time series model that predicts the optimal staffing level based on a sequence of feature sets associated with historical time periods derived from the historical staffing data.

12. The computer program product of claim 10, wherein the staffing level forecasting model comprises at least one machine learning model trained on a set of features derived from the historical staffing data.

13. The computer program product of claim 10, wherein the staffing level forecasting model predicts the optimal staffing level associated with at least one of:
- a number of pickers to pick items for received orders; and
- a number of delivery drivers to deliver orders to customers.

14. The computer program product of claim 10, the steps further comprising:
evaluating a performance metric of the online concierge system when operating with the assigned staff during the future time period, wherein the performance metric comprises at least one of:
- a staff utilization rate;
- a waiting frequency indicative of a rate at which there was a wait time between receiving an order and beginning to fulfill the order; and
- a fallback frequency indicative of a rate at which an external service provider separate from the staff was utilized for order fulfillment.

15. The computer program product of claim 10, wherein obtaining the historical staffing data includes obtaining one or more of the following features for each of a set of historical time intervals:
 a number of staff available at the warehouse;
 a total labor time associated with fulfilling orders;
 a day of the week;
 an hour of the day;
 an indication of whether the day is a holiday;
 a staff utilization rate;
 an average speed per item associated with a labor task;
 an order volume;
 a waiting frequency indicative of a rate at which there was a wait time between receiving an order and beginning to fulfill the order; and
 a fallback frequency indicative of a rate at which an external service provider separate from the staff was utilized for order fulfillment.

16. The computer program product of claim 10, wherein the staffing level forecasting model comprises a queue model that performs simulations of the online concierge system and generates the optimal staffing level based on the simulations.

17. The computer program product of claim 10, wherein assigning the staff of the warehouse to the shifts comprises:
 maximizing a constrained objective function based on a cumulative labor efficiency value.

18. The computer program product of claim 17, wherein maximizing the constrained objective functions comprises:
 enforcing one or more constraints including one or more of:
 a first constraint that each shift for a worker starts later than a start of an availability window for the worker;
 a second constraint that each shift for the worker ends earlier than an end of the availability window for the worker;
 a third constraint that multiple shifts for the worker do not overlap; and
 a fourth constraint that each shift includes at least the optimal staffing level predicted by the staffing level forecasting model.

19. A computer system comprising:
 one or more processors; and
 a non-transitory computer readable storage medium having instructions encoded thereon that, when executed by a processor, cause the processor to perform steps comprising:
 obtaining historical staffing data associated with an online concierge system that processes order requests from customers via a customer application, assigns the order requests to available pickers to procure items from a warehouse, and generates routing instructions for facilitating deliveries to the customers by delivery drivers in accordance with the order requests;
 training a staffing level forecasting model as a machine-learning model with the historical staffing data, wherein training of the staffing level forecasting model comprises:
 evaluating an order fulfillment efficiency based on staffing levels over a historical time period,
 generating training data based on the order fulfillment efficiency of the staffing levels over the historical time period, and
 training the staffing level forecasting model with the training data to predict a staffing level for a future time period;
 applying the staffing level forecasting model to predict an optimal staffing level for the warehouse during the future time period to achieve a target order fulfillment efficiency;
 assigning staff of the warehouse to shifts during the future time period based in part on the optimal staffing level predicted by the staffing level forecasting model;
 evaluating order fulfillment efficiency of the online concierge system when operating with the assigned staff during the future time period;
 comparing the evaluated order fulfillment efficiency for the future time period to the target order fulfillment efficiency; and
 retraining the staffing level forecasting model by updating one or more parameters of the staffing level forecasting model based on the comparison of the evaluated order fulfillment efficiency to the target order fulfillment efficiency.

20. The computer system of claim 19, wherein the staffing level forecasting model comprises a time series model that predicts the optimal staffing level based on a sequence of feature sets associated with historical time periods derived from the historical staffing data.

* * * * *